(12) United States Patent
Boorstein

(10) Patent No.: US 9,504,313 B2
(45) Date of Patent: *Nov. 29, 2016

(54) TOOTHBRUSH COVER AND RELATED DISPENSER

(76) Inventor: Daniel Boorstein, Birmingham, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/551,052

(22) Filed: Jul. 17, 2012

(65) Prior Publication Data

US 2012/0279007 A1 Nov. 8, 2012

Related U.S. Application Data

(63) Continuation-in-part of application No. 13/033,630, filed on Feb. 24, 2011, now Pat. No. 8,245,840.

(60) Provisional application No. 61/307,895, filed on Feb. 25, 2010.

(51) Int. Cl.

| | |
|---|---|
| *B65D 81/24* | (2006.01) |
| *A46B 17/06* | (2006.01) |
| *A45D 44/18* | (2006.01) |
| *B65D 81/22* | (2006.01) |
| *B32B 37/00* | (2006.01) |
| *A47K 1/09* | (2006.01) |
| *A46B 17/04* | (2006.01) |

(52) U.S. Cl.
CPC ............. *A46B 17/06* (2013.01); *A45D 44/18* (2013.01); *A46B 17/04* (2013.01); *A47K 1/09* (2013.01); *B32B 37/00* (2013.01); *B65D 81/22* (2013.01); *A46B 2200/1066* (2013.01); *B65D 81/24* (2013.01); *Y10T 29/49885* (2015.01)

(58) Field of Classification Search
CPC ...... A45D 44/18; B65D 81/22; B65D 81/24; A46B 17/04; B32B 37/00; A47K 1/09
USPC ....... 206/361, 362.2, 362.3, 15.2, 15.3, 209, 206/209.1, 581; 383/36
See application file for complete search history.

(56) References Cited

U.S. PATENT DOCUMENTS

| | | |
|---|---|---|
| 1,194,540 A | 8/1916 | Quartararo |
| 1,653,540 A | 12/1927 | Bigoney |
| 1,827,654 A | 10/1931 | Harper |
| 2,043,629 A | 6/1936 | Lyon |
| 2,377,311 A | 6/1945 | Campbell |
| 2,956,851 A | 10/1960 | Merendino |
| 3,905,954 A | 9/1975 | Jones et al. |
| 4,214,657 A | 7/1980 | Winston |
| 4,362,241 A | 12/1982 | Williams |
| 4,372,314 A | 2/1983 | Wall |

(Continued)

*Primary Examiner* — Andrew Perreault
(74) *Attorney, Agent, or Firm* — The Weintraub Group, P.L.C.

(57) ABSTRACT

A cover for a dental appliance, such as a toothbrush, includes an exterior sleeve or sheath and an expansible foraminous interior cup. The head of a toothbrush is removably nested within the interior cup. The exterior sheath is formed from a pliable material which may be twisted around the head of a toothbrush to isolate it from the ambient. A disinfectant is disposed within the interior cup either by impregnation thereof or by an additional layer and which is in contact with the bristles of the toothbrush head. The disinfectant is water soluble and is activated by contact with water and/or saliva and absorbs the same when in contact therewith to minimize and/or reduce the redeposition of germs and bacteria when the brush is next used. A dispenser may be utilized therewith which removably stows both a toothbrush and a plurality of the covers.

18 Claims, 7 Drawing Sheets

(56) References Cited

U.S. PATENT DOCUMENTS

| | | |
|---|---|---|
| 4,782,946 A | 11/1988 | Pollak |
| 4,906,464 A | 3/1990 | Yamamoto et al. |
| 4,973,171 A | 11/1990 | Bullard |
| 5,139,142 A | 8/1992 | Simon |
| 5,178,469 A * | 1/1993 | Collinson .................. 383/1 |
| 5,350,064 A | 9/1994 | Schneck et al. |
| 5,480,027 A | 1/1996 | Leonard et al. |
| 5,487,201 A * | 1/1996 | Hansen et al. ............ 206/581 |
| 5,556,699 A | 9/1996 | Nirra |
| 5,566,823 A | 10/1996 | Summers |
| 5,630,505 A | 5/1997 | Garcia |
| 5,633,083 A | 5/1997 | Iwai et al. |
| 5,771,521 A | 6/1998 | Mcnamee |
| 5,817,325 A | 10/1998 | Sawan et al. |
| D416,729 S | 11/1999 | Koop et al. |
| 5,984,100 A | 11/1999 | Ramsey et al. |
| 6,120,784 A | 9/2000 | Snyder |
| 6,135,279 A | 10/2000 | Dryer |
| 6,186,324 B1 | 2/2001 | Catterson |
| 6,702,113 B2 | 3/2004 | Marino |
| 6,966,441 B2 | 11/2005 | Barham et al. |
| 7,188,629 B2 | 3/2007 | Mehes et al. |
| D570,144 S | 6/2008 | Scofield |
| 7,581,638 B2 | 9/2009 | Shaw |
| 7,700,172 B2 * | 4/2010 | Renn ........................ 428/36.5 |
| 7,954,640 B2 * | 6/2011 | West et al. ................ 206/581 |
| 2004/0129580 A1 | 7/2004 | Cochran et al. |
| 2007/0181448 A1 | 8/2007 | Davis |
| 2010/0314272 A1 | 12/2010 | Jurgens et al. |

* cited by examiner

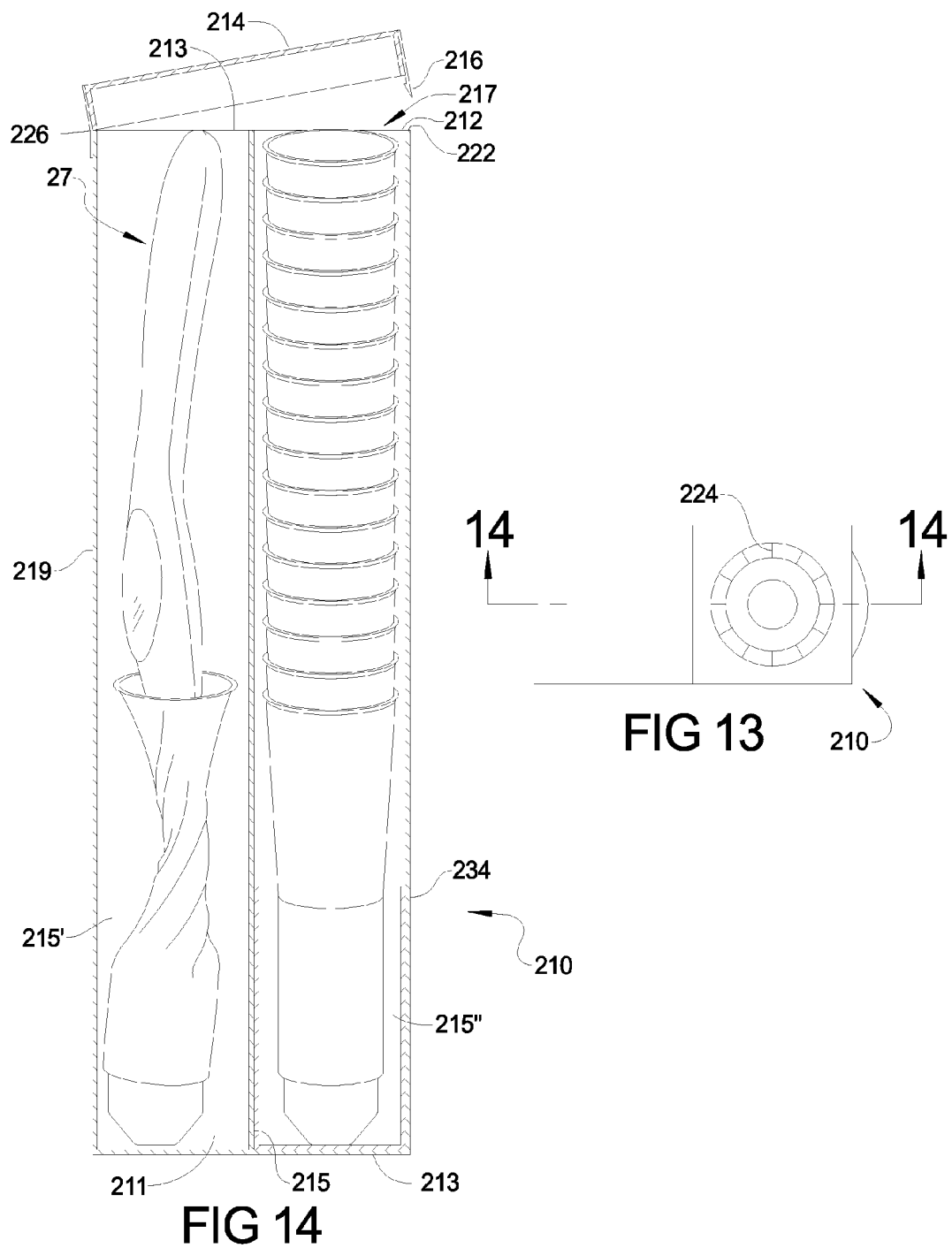

TOOTHBRUSH COVER AND RELATED DISPENSER

CROSS-REFERENCE TO RELATED APPLICATIONS

This application is a continuation-in-part application of U.S. application Ser. No. 13/033,630, filed Feb. 24, 2011, which claims the benefit of U.S. Provisional Application No. 61/307,895 filed Feb. 25, 2010 for "Toothbrush Cover and Related Dispenser," the disclosure which is hereby incorporated by reference in its entirety including the drawings.

BACKGROUND OF THE INVENTION

1. Field of the Invention

Generally, the present invention relates to the field of toothbrushes. More specifically, the present invention relates to a cover for toothbrushes. Even more particularly, the present invention relates to a cover for a toothbrush which absorbs water and/or saliva when used therewith to minimize re-deposition of germs onto the bristles when the brush is next used.

2. Description of the Related Art

Regular brushing of teeth is considered paramount to healthy oral hygiene and prevention of tooth decay. The American Dental Association (ADA) recommends individuals brush their teeth at least twice a day to remove decay-causing plaque and tartar as protection against developing cavities, gingivitis and gum disease. Moreover, in 2003 according to the Lemelson-MIT Invention index the toothbrush was recognized as the number one invention Americans could not live without beating out the automobile, computer, cell phone, and microwave oven. Toothbrush covering devices are additionally important to keep toothbrushes clean and free of bacteria, dirt and the like between uses not only when stored in the ambient, but, especially, when stored in travel case and other closed confines.

The mouth harbors billions of bacteria and contaminates any object that comes in contact. The toothbrush is regularly used multiple times per day to remove food, debris and other dead cell debris, bacteria and bacterial plaques from oral cavity.

Buccal mucosa regenerates, a new mucosal cell replaces the dead cell debris which is washed in the saliva. Dental plaque has been estimated to harbor a billion bacteria per gram. After brushing the toothbrush gets contaminated with bacterial population from the oral cavity. The brush can remain contaminated and can reintroduce bacteria during the next use. This is particularly important because the contaminated brush would be a vehicle to perpetuate the infection process by reintroducing germs from earlier infection well after treatment or therapy.

Toothbrush covering devices have been well known in the art as early as the invention described in U.S. Pat. No. 2,956,851, to Merendino. Numerous other examples exist and while these devices fulfill their respective objectives, there remains a need for improved toothbrush covers.

OBJECTS OF THE INVENTION

It is an object of the present invention to provide a toothbrush cover or other dental appliance that provides a secure fit to existing toothbrushes or appliance.

It is another object of the present invention to provide a cover for a toothbrush or other appliance that is made of relatively soft, lightweight, flexible material.

It is yet a further object of the present invention to provide a dental appliance cover which absorbs water and/or saliva on the appliance when used therewith to minimize re-deposition of germs onto the bristles when the brush is next used. It is a further object of the present invention to provide a disposable soft, lightweight flexible toothbrush cover which absorbs water and/or saliva therefrom when used therewith to minimize re-deposition of germs onto the bristles when the brush is next used.

It is a still further object of the present invention to provide such a cover which facilitates drying of the appliance.

These and other objects are fulfilled by the present invention, as detailed below.

SUMMARY OF THE INVENTION

In accordance with the present invention and in a first embodiment hereof, there is provided a two part, disposable cover for a dental appliance, such as a toothbrush or the like, which comprises an external sheath or sleeve and an interior or internal cup which can disinfect and protect the toothbrush from the ambient.

The cover is formed of materials that enable the interior cup to y absorb moisture, i.e. saliva and water, from the wet appliance to reduce re-deposition of germs, etc. onto the head of the appliance, such as the bristles of a toothbrush, using GRAS antimicrobial/antibacterial compounds, i.e., disinfecting compositions.

The present invention further includes first and second embodiments for a dispenser for removably stowing both an appliance and a plurality of covers, while enabling a plurality of such covers to be dispensed therefrom.

In a further aspect of the present invention there is provided a method for manufacturing the present cover.

For a more complete understanding of the present invention reference is made to the following detailed description and accompanying drawing. In the drawing like reference characters refer to like parts through several views in which:

BRIEF DESCRIPTION OF THE DRAWING

FIG. 13 is a bottom view of the internal chamber of a "hand held" dispenser in accordance with the present invention cross-sectional view of "hand held" dispenser for use with the cover of the present invention, and FIG. 14 is a cross-sectional view of the "hand held" dispenser for use with the cover of the present invention taken along line 14-1 of FIG. 13; and taken along line 14-14 of FIG. 13;

DETAILED DESCRIPTION OF THE PREFERRED EMBODIMENTS

Figure 1:
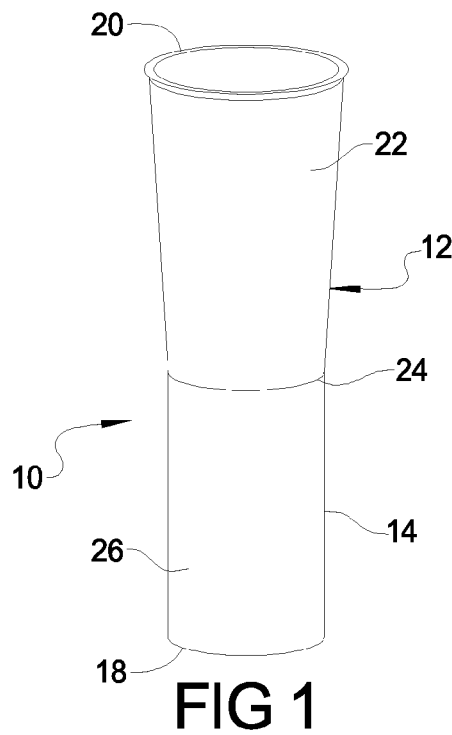
FIG. 1 is a side elevational view of the exterior sheath used for the cover of the present invention.
Figure 2:
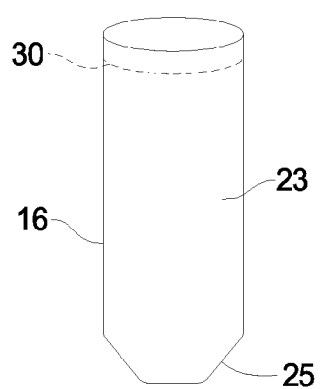
FIG. 2 is a second side elevational view of the interior cup used for the cover of the present invention.
Figure 3:
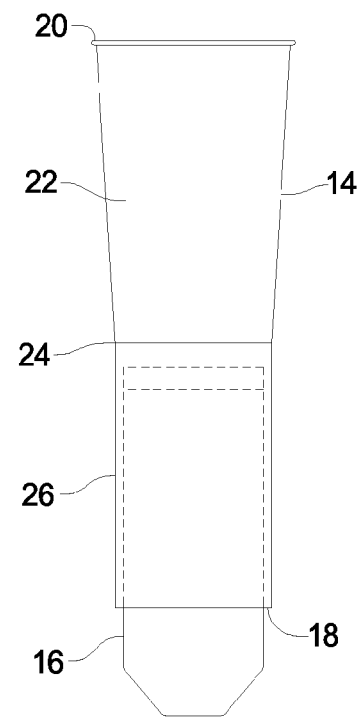
FIG. 3 is a side elevational view, partly in phantom, showing the assembly of the cover hereof.
Figure 4:
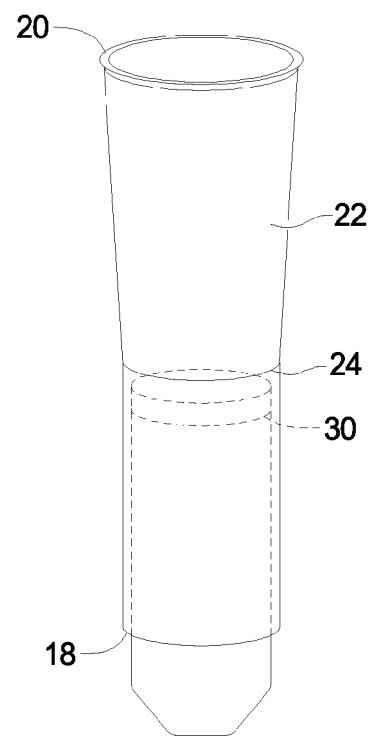
FIG. 4 is a side elevational view, partly in phantom, showing the assembly of the cover of the present invention.

At the outset, it should be noted that for purposes of describing the present invention, it will be done with reference to a toothbrush. However, it is to be understood that the present invention has applicability to other dental appliances as well as other handled devices where disinfection of a portion thereof is desired.

Now, and with reference to the drawing and, in particular, FIGS. 1-4, there is depicted therein a dental appliance cover in accordance with the present invention and, generally, denoted at 10. The cover 10 removably stows at least a part of a toothbrush.

The toothbrush cover 10 is a single use, disposable substantially tubular device 12, comprising an external or outer sleeve or sheath 14 and an interior or internal sleeve or cup 16.

Generally, the sleeve 14 has an open bottom end 18 and an open top 20. The external sleeve 14 includes a downwardly tapering sidewall 22 defining an upper portion and which tapers inwardly from the open top 20 and terminates at a medial portion 24 and, then, merges into a cylindrical portion 26 terminating at the open bottom 18.

The bottom 18 of the external sleeve 14 is open to permit air circulation to accelerate drying of a toothbrush enveloped by the cover.

Figure 5:
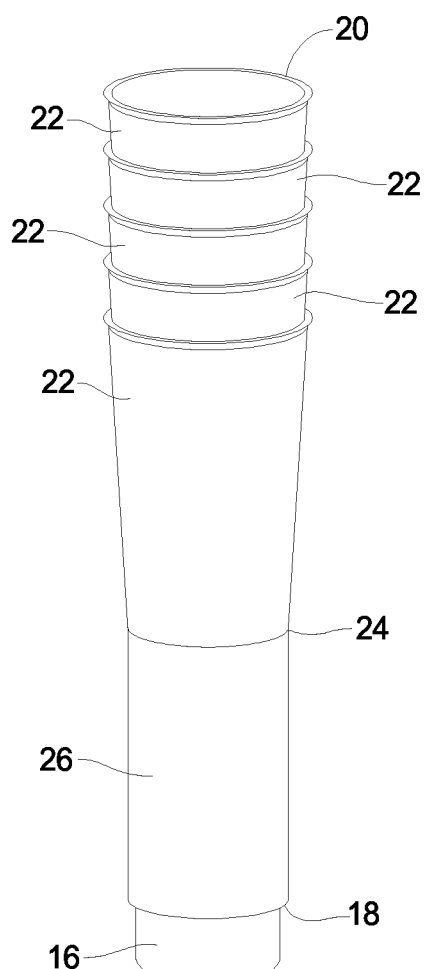
FIG. 5 is a side elevational view showing a plurality of individual covers in a stacked or nested array.

The tapering conical upper portion allows for neat and tight stacking of successive sleeve cover devices, both for packaging purposes and for storage and dispensing of sleeve cover devices within dispenser units, as discussed below, and as shown in FIG. 5.

Although not shown, the open top 20 of the external sleeve may be cut in a diagonal oval shape forming a higher and lower side. The raised side is designed to aid in withdrawing a toothbrush from its cover when a sleeve device 12 is engaged around it if one or several sleeve covers becomes caught or wedged under the sleeve in which the toothbrush is inserted. A user can, then, grab or pinch with his or her thumb and forefinger the higher edge of the outer shell to gently pull and separate the toothbrush with the engaged sleeve around it away from the stack of remaining sleeves.

Preferably, the sleeve 14 is constructed of a somewhat flexible, disposable, liquid impermeable material such as a heavy waxed or otherwise coated paper, cardboard or other similar product known to those of skill in the art. By forming the external sleeve or sheath or shell 14 of wax lined or other similar liquid impermeable coated paper material, it renders the external sheath pliable, shapeable and grippable. The sheath 14 is formed by any suitable process which enables it to be conformed to the desired shape, such as by die cutting. It should be noted that the outer sleeve, while not preferred, may be entirely cylindrical. Additionally, it may be formed, such as by molding, from a suitable plastic, to provide the desired configuration.

The interior cup 16 defines a pouch comprising a sidewall 23 and a curvilinear bottom wall 25 integral therewith. The cup has an open top 27 to enable, at least, a portion of a toothbrush to be removably inserted thereinto. The cup 16 is sized sufficiently to accommodate a standard toothbrush head. It should be noted that although the interior cup is shown with a rounded bottom wall, it is contemplated that the bottom wall be a closed flattened end for ease of manufacture.

The interior cup 16 may be fixedly disposed within the exterior sleeve 14 by any suitable means including, for example, a non-toxic adhesive, friction, crimping and the like. Preferably, the internal cup is constructed of a flexible and highly absorbent and expansible material. For example, expansible compressed cellulosic material such as a sponge material or other highly absorbent and expansible material including paper, cardboard or the like, may be used.

In manufacturing the internal cup, it begins as a piece of flat, compressed and semi-rigid foraminous, flexible material. It is pre-formed into its tubular shape with its curvilinear closed end by any suitable well known commercial process. AS noted, the internal cup is attached to the outer sheath with a safe-to-ingest adhesive material which is used to wrap the exterior sleeve around the cup. Alternatively, the internal cup may be secured to the external sleeve by crimping or other mechanical attachment. When assembled, the bottom end of the cup 16 projects through the open bottom 18 of the sleeve 14.

Upon being formed into its cup shape, but before its insertion and attachment to the inside of the outer sheath, the internal cup is sanitized and disinfected to a biomedical clean standard approved by the American Dental Association (ADA) or Federal Drug Administration (FDA) other U.S. and/or international authority(s) to certify the sleeve cover device safe for oral/medicinal use for adults and children.

After being processed into a biomedical clean state, the internal cup is treated with a disinfectant which, upon contact with a wet or semi-wet toothbrush head is activated, to absorb water and/or saliva from the bristles to reduce the re-deposition of germs and bacteria on the bristles when the toothbrush is re-used. The disinfectant is selected from those which are "Generally Regarded As Safe" (GRAS) compositions. Typically, such compositions are either quaternary ammonium compounds, anionic surfactants, such as linear alkylbenzene sulphonates, alkylbenzene sulfates, the sodium salts thereof and similar compositions, as well as mixtures thereof.

Antimicrobial products used in mouthwash can be safely used for impregnating the cup 16.

Aside from alcohol, there are two classes of antimicrobial/microbicidal products typically used for mouthwash which can be used for embedding or impregnation. Suitable quaternary ammonium compounds include, for example, benzalkonium chloride, cetylpyridinium chloride, domiphen bromide and mixtures thereof. The concentration of quaternary ammonium compounds used herein ranges from about 0.001% to about 0.5% by w/w in the solubilized form.

The quaternary ammonium compounds can be used at a neutral pH.

The anionic surface active agents which can be used herein is a food grade surfactant and is used at acidic pH preferably of about pH 3.0.

The preferred anionic surfactant is sodium lauryl sulfate. A non-toxic acidifying agent such as citric acid can be used along with the sodium lauryl sulfate to adjust the pH to pH 3.0. The concentration of sodium lauryl sulfate typically ranges from about between from 250 ppm (0.025% w/w) to about 1000 ppm (0.1% w/w) when solubilized.

The impregnation can be achieved by laminating a dry form of the product inside the cup 16 so when a wet brush comes in contact with the laminated product, it will solubilize the antimicrobial/antibacterial disinfectant and reactivate its microbicidal properties. The solubilized material then can diffuse into the wet brush and kill bacteria present on and between the bristles and on the surface of brush. The antibacterial compound is impregnated into the internal cup by any suitable means such as by dipping, spraying, or the like.

Water from a wet brush can be used to activate the disinfectant as the bristles come in contact with the dry ingredients embedded in the toothbrush bristles. The laminated inner cup is designed in such a way to release the embedded material readily when the bristles come in contact. However, embedding can also be achieved by other ways.

The ingredients should be free of any color or odor so that the cover, itself, will not impart unacceptable properties for individual use. However, a flavorant such as mint or the like may be incorporated into the disinfection solution such that the user obtains a sense of refreshment when using the disinfected toothbrush.

Alternatively, in lieu of impregnating the internal cup, a strip comprising a micro-thin, water soluble strip comprising the same antibacterial antimicrobial described above may be disposed on the exposed surface of the internal cup. Such a water soluble strip will dissolve immediately upon contact with a wet or semi-wet toothbrush and provide sanitizing and refreshing treatment to the toothbrush bristles. Such a strip comprises a layer of material attached to the internal cup material prior to the manufacturing process that forms the internal cup.

Referring now to FIGS. 6(a)-(d) and 7(a)-(b), there is illustrated the use of the present cover 12. As shown, a toothbrush 26 is inserted into a sleeve cover device 10 such that the interior cup 16 is disposed around a toothbrush head 28. The cover is secured onto the toothbrush by the user twisting that portion of the external sleeve which extends beyond the base of the toothbrush head and up the handle of the toothbrush. Twisting of the portion of the sleeve cover device that extends past the toothbrush head, proximate the merger 24, and along the toothbrush handle can be accomplished by pinching or enveloping the wax-lined paper sleeve with the thumb and several fingers or cupping a hand around the sleeve and twisting it closed either in a clockwise or counterclockwise direction around the base of the toothbrush handle.

Figure 8A:
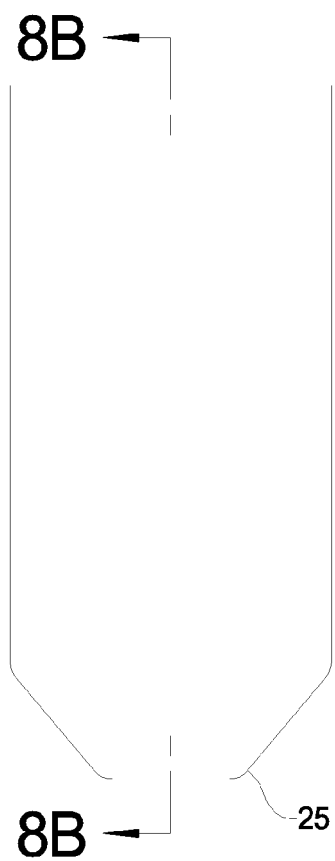
FIG. 8(a)-(b) is a cutaway side elevational view, partly in cross-section, showing a toothbrush stowed within a cover after activation of a disinfectant.
Figure 8B:
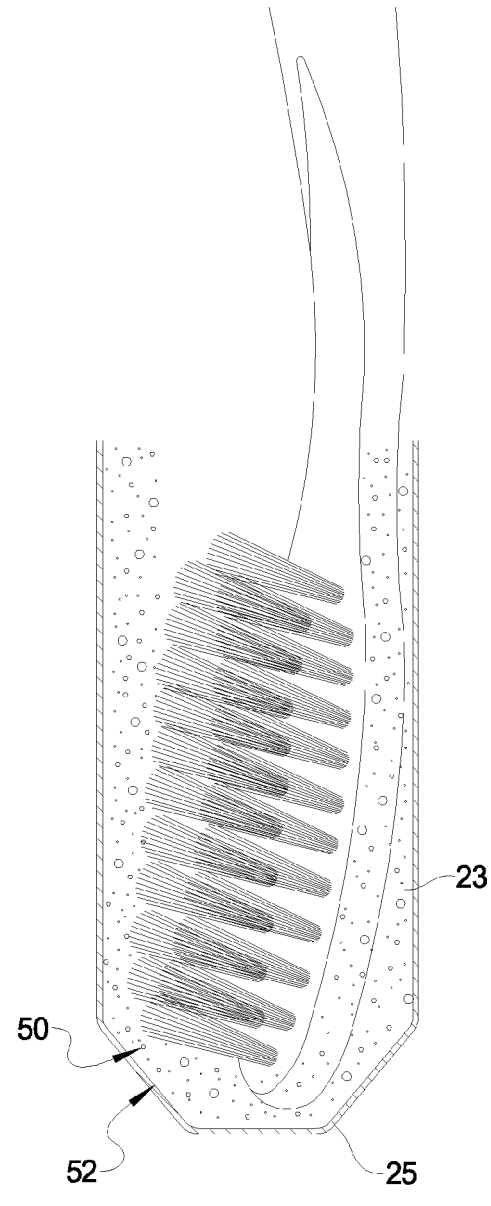
Figure 9:
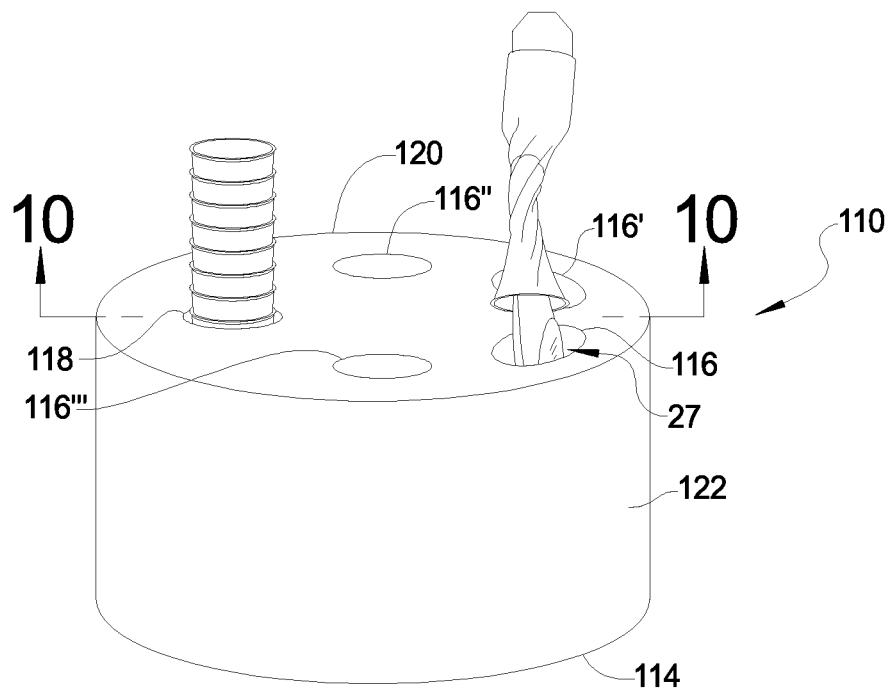
FIG. 9 is a side elevational view depicting a "table top" dispenser.

As shown in FIG. 8(a)-(b), contact from a wet or semi-wet toothbrush head causes the interior of the internal cup 16 to expand, slightly swell and compress around the toothbrush bristles delivering the sanitizing, anti-bacterial, anti-microbial compound onto the bristles of the toothbrush head. The chemical or natural elements will be activated by contact with water or salvia killing or reducing bacteria and other microbial matter that may be on the toothbrush head to a greater degree than air drying currently provides. The swelling and expanding internal cup 16 will simultaneously absorb water and/or residual saliva off the toothbrush bristles to prevent re-deposition onto the bristles when next used.

It should be noted that the internal cup 16 may be scored, such as at 30, whereupon, when twisted, a portion of the cup 16 will also encircle the toothbrush as well as the sheath 14.

The covered toothbrush head and handle can be stored in any convenient manner, i.e., vertically in any universal sized toothbrush holder or the like, or loosely stored inside of a drawer, cabinet or travel case. In addition to providing an enhanced method of secure attachment to the toothbrush handle, twisting of the sleeve cover device close around the toothbrush handle also prevents leakage of residual water and/or salvia that may drip off of the toothbrush.

The sleeve cover device is removed by untwisting it in a clockwise or counterclockwise motion, whichever is the opposite of the direction it was closed, and then pulling and/or ripping the used sleeve cover device away from the toothbrush handle and toothbrush head.

The materials used to construct the sleeve cover device are intended to be biodegradable and, therefore, the sleeve cover device is safe to dispose of in any refuse container. If the materials that make up the sleeve cover device are both biodegradable and compostable, then the sleeve cover device may be both small enough and safe for disposal via bathroom waste water facilities.

In order to facilitate separation of one sleeve cover from another, optimally, the external sleeve is coated with a friction reducing material such as a paraffinic material, natural coating or the like. Preferably, because of the "green" nature of the device, a natural coating which provides grippability is preferred. One particular natural coating is zein, which is a corn-derivative. Zein is water resistant and exhibits a "wax-like" grippability. The coating may be applied by any suitable technique, such as spraying, dipping and the like. Both the interior and exterior of the external sleeve are contemplated as being coated. Similarly, the lower end of the exterior of the internal sleeve may be like coated.

The lower end of the sleeve 14 is pleated to promote retention of the internal sleeve within the external sleeve.

Referring now to FIGS. 9-12 there is depicted therein a first embodiment of a dispenser for use with the present invention and generally denoted at 110. This first embodiment is contemplated as a "table top" dispenser. The table top dispenser 110 is, preferably, constructed of plastic, metal or any other suitable durable and washable material. Similarly, It can be constructed in any geometric shape or design, i.e., round, square, rectangular, etc. Preferably, the top dispenser 110 is large enough to stow a plurality of toothbrushes and, generally, from two to eight toothbrushes.

The dispenser 110 has a flat, stable bottom 114 allowing it to rest on any flat or partially flat surface, a top 120 wall and a sidewall 122.

A series of chambers or bores 116, 116', etc. are cut into the dispenser 110 through an associated opening formed in the top 120, as shown. Each bore 116, 116', etc. is large enough to permit a single toothbrush 26 to be inserted, handle first, vertically or near vertically for storage until its next use.

The spacing between the holes is great enough to allow each stored toothbrush, when engaged inside of a sleeve cover device, to stand upright in the dispenser unit and not touch another adjacent toothbrush. Generally, the area allotted for toothbrush storage looks similar to any traditional toothbrush holder, but the insert holes have slightly more room allotted between each slot.

Figure 10:
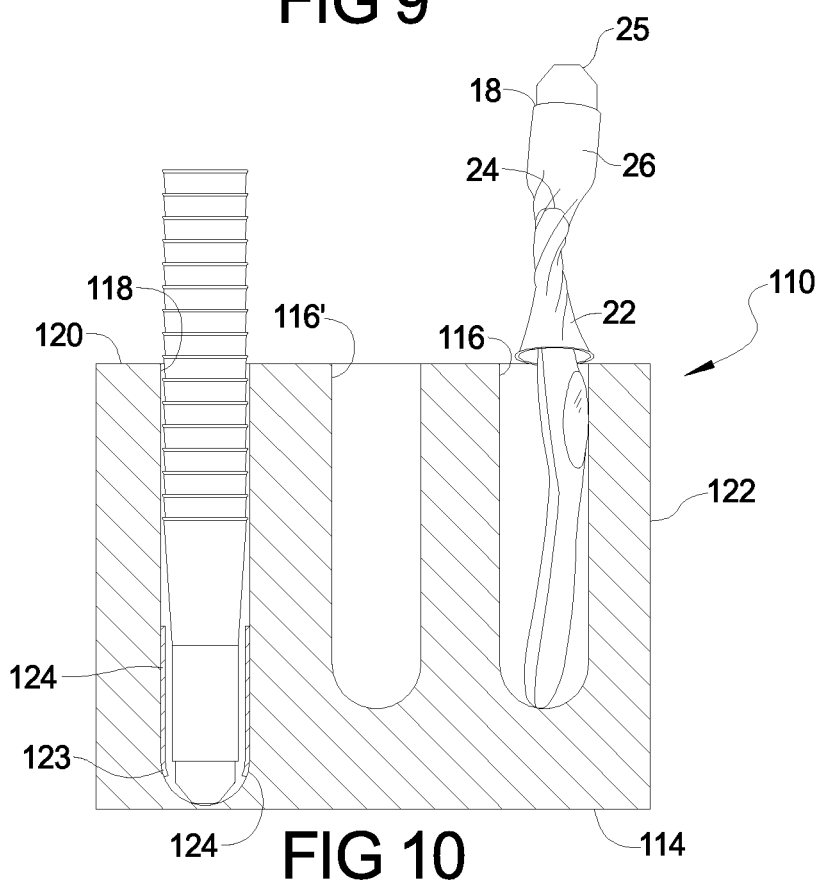
FIG. 10 is a cross-sectional taken along line 10-10 of FIG. 9 with the toothbrush removed.

The dispensing unit 110 also has a large opening 118 provided in either the top 120 or the sidewall 122 of the unit which opens into an interior chamber or compartment 123. The opening 118 is of sufficient diameter to accept and dispense a plurality of sleeve cover devices 12 stored in the compartment 123 as shown in FIG. 10. The compartment 123 may be complementary in shape to that of a sleeve or a stack of sleeve(s). Preferably, a plurality of inwardly extending ribbed ridges 124 are formed on the wall of the compartment 123.

The ridges run vertically up and down the compartment walls and are spaced equidistantly apart. The ridges 124 provide slight air flow between the sleeve cover devices and the storage compartment walls, preventing an air tight seal which can wedge in or hinder the retraction of a sleeve cover device as it is retracted out of the storage compartment. The sleeve storage compartment 123 is deep enough to hold a plurality of sleeve cover devices.

Although not shown the compartment 123 may be equipped with a spring loaded device on the bottom thereof inside of the compartment to push sleeve cover devices upward to aid a user inserting a toothbrush into a sleeve.

The opening 118 does not have a lid, thereby, allowing a dispenser unit to be reloaded with additional sleeve cover devices by dropping or sliding a stack of sleeves through the hole or aperture 118 into the chamber 123.

A stack of sleeve cover devices is inserted into the storage compartment with the closed end or bottom 25 of the internal cup 16 facing downward into the compartment 123.

Figure 12:
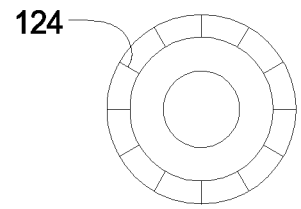
FIG. 12 is a bottom view of the cover storage chamber of the cover storage chamber of the table top dispenser.
Figure 11:
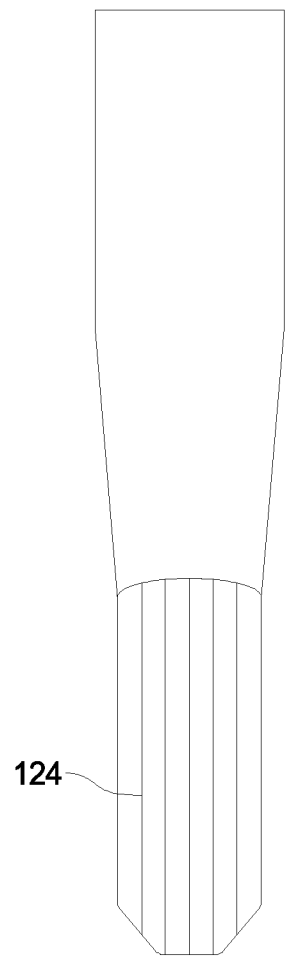
FIG. 11 is a side elevational view of the cover storage chamber of the table top dispenser separated therefrom.
Figures 6A, 6B, 6C, 6D:
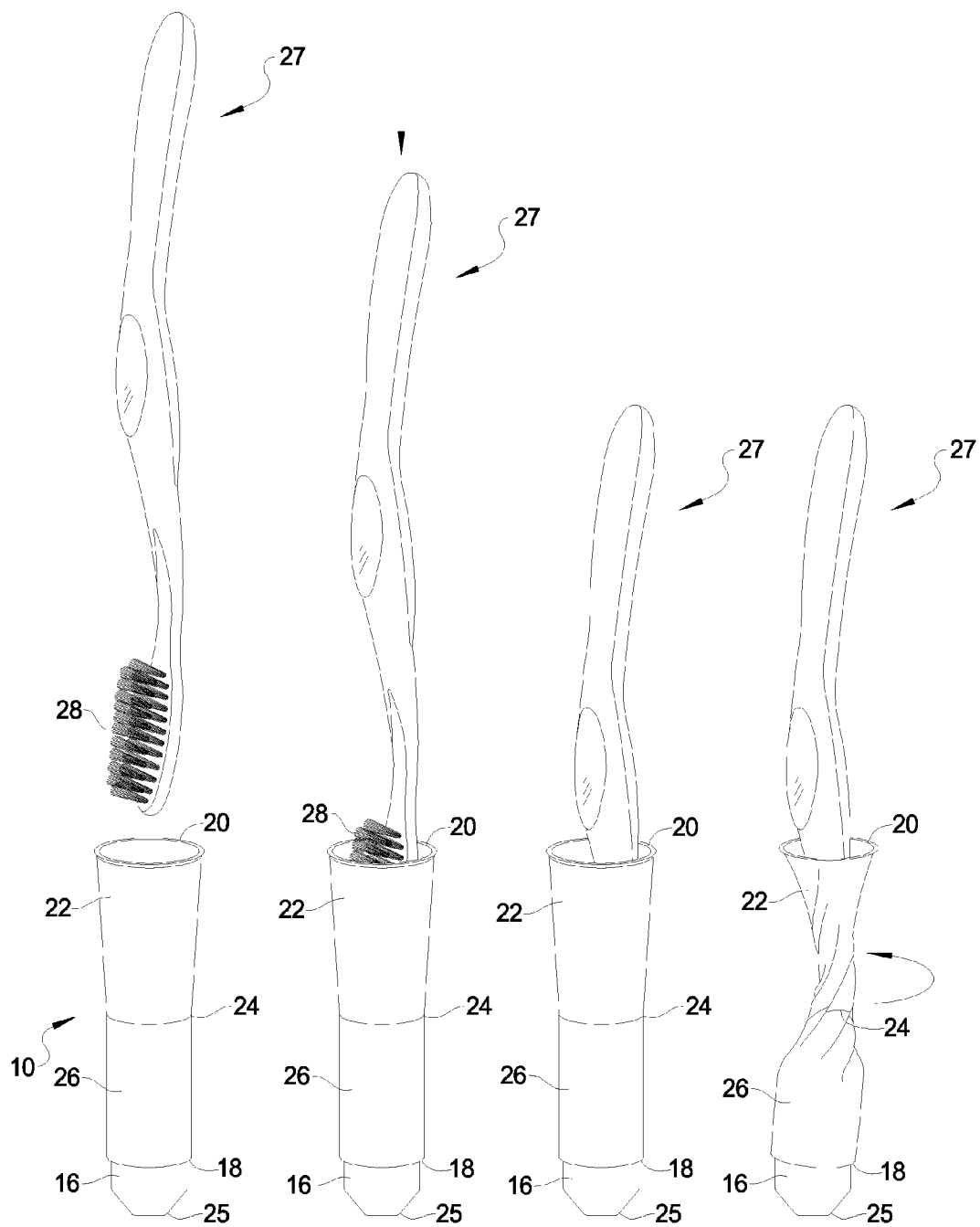
FIG. 6(a)-(d) is a side elevational view showing the deployment of the cover of the present invention.
Figure 7A:
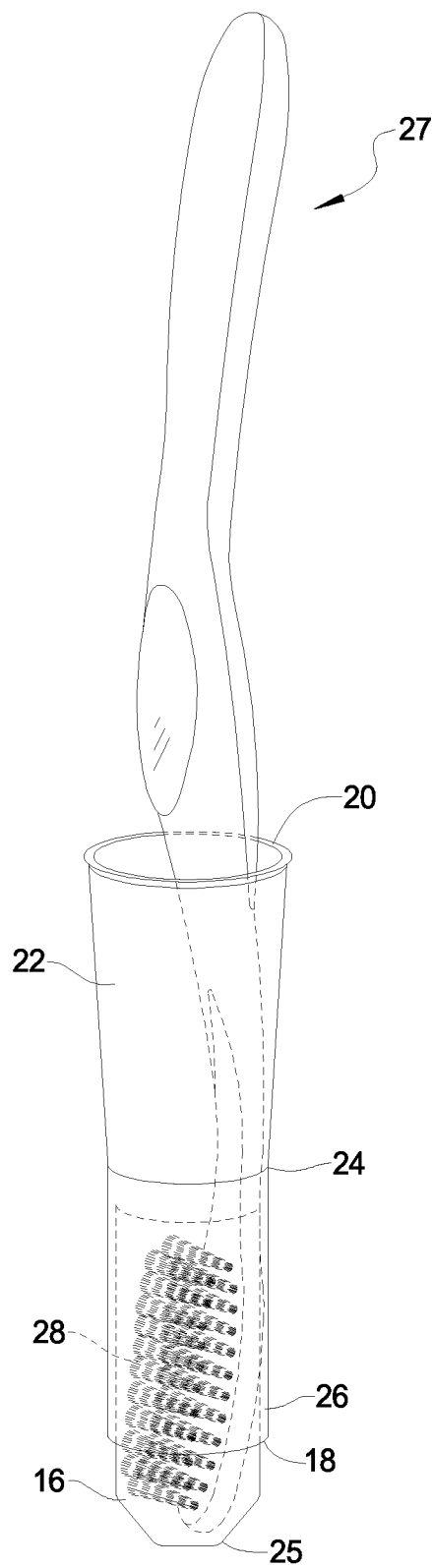
FIG. 7(a)-(b) is a view similar to FIG. 6 but showing the disposition of a toothbrush within the cover hereof.
Figure 7B:
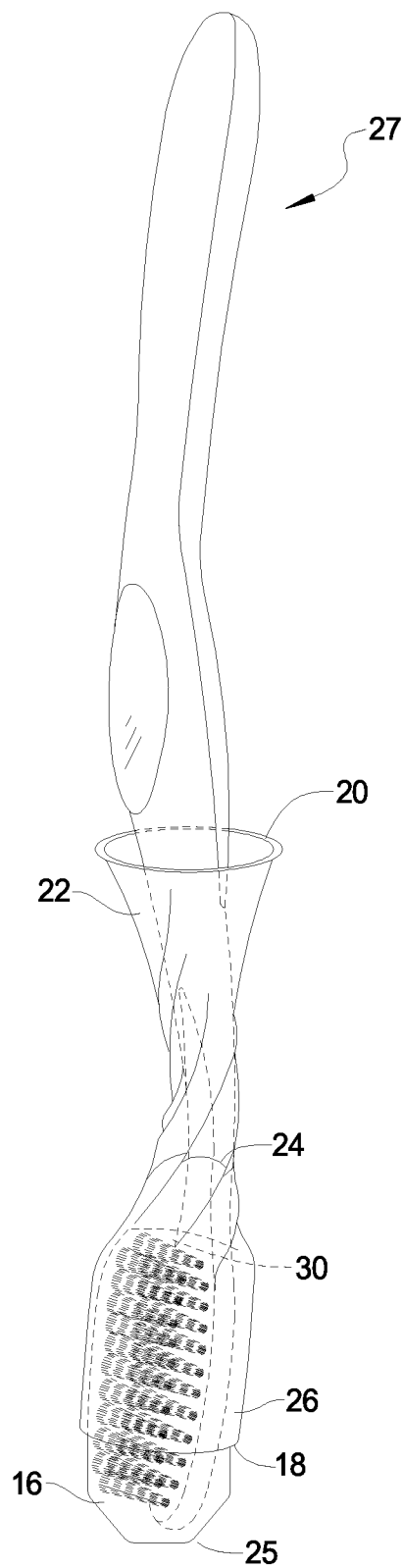

As shown, particularly in FIGS. 11 and 12 the sleeve cover storage compartment 123 may be formed as a separable element insertable and removable via the opening 118, into a bore provided in the interior of the dispenser thereby enabling it to be used independently. For example, it may be disposed in a conventional paper cup dispenser or the like, thereby converting or retrofitting such a device into a toothbrush sleeve cover device dispenser.

To insert a toothbrush 26 into a sleeve cover device 12 held within the compartment 123, a user holds a toothbrush 26 by its handle in a vertical position with the toothbrush head 28 facing downward. The user gently pushes or inserts the toothbrush head into the open end 20 of the top exterior sleeve 14 thereby wedging the head of the toothbrush into the internal cup 16.

Due to the nature of the material used to construct the internal cup, the wall of the cup 16 swells and expands around a wet or semi-wet toothbrush head. Due to the tapering conical shape of the cup 16, upon insertion of the toothbrush head into the bottom thereof, the toothbrush head wedges itself semi-firmly in the sleeve cover device.

The combination of wedging the toothbrush head inside the internal cup and the swelling and expansion of the internal cup material around wet or semi-wet toothbrush bristles allows the user to retract the toothbrush with a sleeve cover device engaged around the toothbrush head away from a stack of sleeves.

The user retracts the toothbrush engaged inside of a sleeve by pulling the toothbrush.

The next sleeve cover device will be exposed or may be pushed up by a spring loaded device and be available for future toothbrush insertion and retraction.

To help users avoid pushing the dispenser unit off its resting place as they insert a toothbrush into a sleeve which is held inside of the dispenser's storage compartment, the dispenser 110 can, optionally, include a conventional material permanently affixed to the flat bottom 114 of the unit. Alternatively, the bottom 114 of the table top dispenser unit may be sloped outward in all directions at the base to provide stability for the dispensing unit as users insert toothbrushes into sleeve covers held inside of the dispensing unit storage compartment.

Referring now to FIGS. 13 and 14, there is depicted therein a second embodiment of a dispenser, generally, denoted at 210. This embodiment may be denoted as a "hand held" dispenser. The dispenser 210 is constructed of plastic, metal or any other suitable durable and washable material. The dispenser 210 can be rectangularly shaped and of sufficient length or height to house a plurality of sleeve cover devices 12 and a typical sized manual toothbrush 26 or a detached electric toothbrush head with attached bar (not shown). An electric toothbrush head can be stored in the hand held dispenser so long as the electric toothbrush head is removable from its base and the toothbrush head has at least 2-6 inches of a handle or bar attached with it.

The dispenser 210 has a bottom wall 213, an open top 217 and a sidewall 219. The dispenser 210 has an interior chamber 211. The chamber 211 has a dividing wall 215 to divide the chamber into two sub-chambers or storage areas 215' and 215" to separate a toothbrush from the cover(s). The open top 217 provides an opening 213 of any desired geometry, i.e., round, square, rectangular, elliptical, etc. large enough to allow a toothbrush 26 to be inserted therethrough into the chamber 217 with its head end first. The unit 210 may also include a flip top 214 with a simple snap catch or clip 216 for closing the dispenser.

The top 217 of the unit 210 has a second, larger opening or aperture 222. The aperture 222 is used to accept and dispense at least one and, preferably, a plurality of sleeve cover devices 12 therefrom.

As shown, a hinge pin 226 is used to rotatably mount the flip lid or top 214 to the dispenser. When the lid 214 is rotated to its closed position, it seals shut the dispensing aperture 222 protecting the remaining sleeves from collecting loose dirt, debris and airborne microscopic organisms and preventing stored sleeves from falling out of the storage compartment. The lid is held closed by a clip or turn fastener 216 and is able to be operated with the flip or turn of finger or thumb.

The interior of sub-chamber or compartment 215" has a plurality of raised ridges 234 along the chamber wall. The compartment 215" may be complementary in shape to that of the device 12. The chamber 215" is ordinarily long enough to hold a plurality and, preferably, from about 7 to 14 or more stacked sleeve cover devices 12. The chamber 215" is slightly offset from center to allow extra space inside of the unit for the toothbrush storage area. Optionally a small spring loaded device (not shown) may be included to urge the sleeves upward toward the aperture.

In use, a user flips open the lid 214 and inserts a toothbrush into a sleeve cover 12. After inserting a toothbrush into a sleeve cover device it is then withdrawn from the dispenser and may be stowed in chamber 215'. Access to the storage chamber 211 is closed by flipping the hinged lid 214 over and securing it with the catch clip or turn fastener. The remaining sleeve cover devices are then stored inside of the dispensing unit for future use.

The dispenser unit serves multiple purposes: (1) as a dispenser of new sleeve cover devices, and (2) as a storage container that holds both stacks of new sleeve cover devices for future use and one or multiple toothbrushes which may or may not be enclosed in individual sleeve cover devices.

Either of the dispensers can be constructed of hard plastic, metal or other sturdy, durable and washable materials and are intended to be permanent or at least long lasting with the purpose of providing a dry, convenient storage container to hold and dispense individual sleeve cover devices prior to their use. The sleeve cover devices and dispenser units are designed to be a complementary two part system, although the sleeve cover devices can be used alone without the specially designed dispenser units.

The sleeve cover devices 12 hereof provide multiple functions: (1) as an external cover protecting the toothbrush head/bristles from large bits of debris, dust and other dirt and from microscopic airborne particles, bacteria or germs that may infect the toothbrush head between uses of the toothbrush, and (2) as a sanitizing and refreshing wrap killing or at least reducing in a more significant percentage then air drying alone bacteria and other microbial that may have been directly imparted onto the toothbrush bristles by the most recent user of the toothbrush.

The size and design of a sleeve cover device in accordance herewith is intended to be universal to accommodate all sizes of toothbrushes sold commercially or supplied by dentists to patients. The sleeve cover device hereof is also intended to accommodate both manual and electric toothbrushes.

It should be noted that in practicing the present invention the sheath 14 and cup 16 may be separable elements such that after the head of a toothbrush is disposed with a cup 16 a separate sheet of material as that of the sheath may then be wrapped around the cup.

The invention has been described in an illustrative manner, and it is to be understood that the terminology, which has been used herein, is intended to be in the nature of words of description rather than of limitation.

Obviously, many modifications and variations of the present invention are possible in light of the above teachings. It is, therefore, to be understood that within the scope of the described invention, the invention can be practiced otherwise than as specifically described.

Having, thus, described the invention; what is claimed is:

1. A cover for a dental appliance, comprising:
    a biodegradable, compostable and twistable external sleeve, having an open top and open bottom;
    a biodegradable, and compostable cellulosic, liquid absorbing closed bottom internal sleeve disposed within the external sleeve, a portion of the internal sleeve projecting through the open bottom of the external sleeve, the internal sleeve being dimensioned to removably nest a head of a dental appliance therewithin, the internal sleeve being sanitized and disinfected to a biomedical clean standard approved by the American Dental Association (ADA) or Federal Drug Administration (FDA) other U.S. and/or international authority(s) prior to being disposed within the external sleeve; and
    a water-activated disinfectant deposited within the internal sleeve and in contact with the head of the appliance when the head is nested within the internal sleeve, and wherein the internal sleeve absorbs liquid from the head of the appliance whereby the disinfectant reduces any redeposition of germs or bacteria onto the appliance head.

2. The cover of claim 1, which further comprises:
    a natural friction reducing coating deposited on the external sleeve.

3. The cover of claim 2 wherein the coating is a zein coating.

4. The cover of claim 1 wherein the cellulosic material is a sponge.

5. The cover of claim 1, wherein the disinfectant is impregnated in the internal sleeve.

6. The cover of claim 1, wherein the disinfectant compound is selected from the group consisting of quaternary ammonium halides, and an anionic surfactant.

7. The cover of claim 1 which further comprises:
    a friction reducing coating deposited on the exterior and interior of the external sleeve and at least a portion of the exterior of the internal sleeve.

8. The cover of claim 7 wherein: the coating is a wax-like naturally occurring coating.

9. The cover of claim 8 wherein: the coating is zein.

10. In combination,
    (a) a dispenser comprising (1) a chamber for removably storing a dental appliance therewithin, (2) a second chamber for removably storing at least one dental appliance cover, and
    (b) at least one dental appliance cover disposed within the second chamber, the cover comprising the cover of claim 1.

11. In combination,
    (a) a dispenser comprising a housing having an internal chamber, the chamber being dimensioned to removably stow (1) a dental appliance and (2) at least one cover for the dental appliance, the cover comprising the cover of claim 1.

12. The cover of claim 6 wherein the disinfectant is sodium lauryl sulfate.

13. The disinfectant of claim 12 wherein the sodium lauryl sulfate is in admixture with citric acid.

14. The cover of claim 6 wherein the disinfectant is at pH of pH 3.0.

15. A method of manufacturing a cover for a dental appliance, comprising:
    (a) providing a flexible external sleeve of a first material, the material being coated with a friction-reducing material;
    (b) forming an internal sleeve from a sponge material, the internal sleeve being dimensioned to be wrapped around by and be enveloped within the external sleeve;
    (c) providing a water activated disinfectant composition associated with the internal sleeve;
    (d) disposing the internal sleeve with the disinfectant composition within the external sleeve; and
    wherein the internal sleeve is dimensioned less than that of the external sleeve.

16. The method of claim 15 wherein:
    the external sleeve has an open top and open bottom, the internal sleeve being tubular having a closed first end and a closed opposed second end, the bottom of the internal sleeve projecting through the bottom of the external sleeve.

17. The method of claim 15 wherein: the friction reducing coating is deposited on the exterior and interior of the external sleeve and at least a portion of the exterior of the internal sleeve, the friction reducing material being a naturally occurring water resistant material.

18. The method of claim 17 wherein: the coating is zein.

* * * * *